United States Patent
Ciubotariu et al.

(10) Patent No.: US 10,268,832 B1
(45) Date of Patent: Apr. 23, 2019

(54) STREAMING AUTHENTICATED ENCRYPTION

(71) Applicant: Amazon Technologies, Inc., Seattle, WA (US)

(72) Inventors: Nick Ciubotariu, Seattle, WA (US); Brett Lounsbury, Tempe, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 15/633,574

(22) Filed: Jun. 26, 2017

(51) Int. Cl.
*G06F 21/62* (2013.01)
*H04L 29/06* (2006.01)

(52) U.S. Cl.
CPC ........ *G06F 21/6218* (2013.01); *H04L 63/061* (2013.01); *G06F 2221/2107* (2013.01)

(58) Field of Classification Search
CPC ......... G06F 21/6218; G06F 2221/2107; H04L 63/061
See application file for complete search history.

(56) References Cited

U.S. PATENT DOCUMENTS

| | | | | |
|---|---|---|---|---|
| 7,921,288 B1* | 4/2011 | Hildebrand | ............. | H04L 63/04 713/165 |
| 9,292,699 B1* | 3/2016 | Stuntebeck | ........... | G06F 21/602 |
| 2007/0101123 A1* | 5/2007 | Kollmyer | .......... | H04L 29/06027 713/154 |
| 2008/0034222 A1* | 2/2008 | Torisaki | ................... | G06F 21/10 713/193 |
| 2011/0066843 A1* | 3/2011 | Newman | ................ | A63F 13/358 713/153 |
| 2011/0213978 A1* | 9/2011 | Fouchard | ............. | H04L 9/3215 713/171 |
| 2014/0068791 A1* | 3/2014 | Resch | .................. | G06F 21/6272 726/30 |
| 2015/0312222 A1* | 10/2015 | Raguso | ............... | H04L 63/0428 713/171 |
| 2016/0277181 A1* | 9/2016 | Wong | ........................ | G09C 1/00 |
| 2016/0321460 A1* | 11/2016 | Suter | .................... | G06F 21/6209 |
| 2016/0344707 A1* | 11/2016 | Philipp | ............... | H04L 67/1097 |
| 2017/0104762 A1* | 4/2017 | Feng | .................... | G06F 21/6218 |
| 2017/0177883 A1* | 6/2017 | Paterra | .................. | G06F 21/606 |
| 2017/0357830 A1* | 12/2017 | Benson | .................... | G06F 21/72 |
| 2018/0314837 A1* | 11/2018 | Testerman | ............ | G06F 21/602 |

OTHER PUBLICATIONS

Watanabe et al., "Key Update Mechanism for Network Storage of Encrypted Data," 2013 IEEE 5th International Conference on Cloud Computing Technology and Science Year: 2013 , vol. 1 pp. 493-498.*

Pleshkova et al., "Method for comparative performance analyze of encryption algorithms used in public key infrastructure for secure transmitting of audio information" 2017 40th International Spring Seminar on Electronics Technology (ISSE) Year: 2017 pp. 1-4.*

* cited by examiner

*Primary Examiner* — Roderick Tolentino
(74) *Attorney, Agent, or Firm* — Knobbe, Martens, Olson & Bear, LLP

(57) ABSTRACT

Systems are provided for the streamlining authentication of encrypted data. In streaming authentication, the authentication and decryption of a data file is performed in a streaming manner. The data file can be stored as a collection of discrete encrypted portions. When the data file is to be accessed, it can be authenticated in a streaming manner, as discrete portions of the large file are loaded from storage or transmitted to other systems.

20 Claims, 7 Drawing Sheets

STREAMING AUTHENTICATED ENCRYPTION

BACKGROUND

Computing systems and communication networks can be utilized to exchange information. In a common application, one computing system (such as a user computing device) can provide information to another computing system (such as a server computing system) for remote storage. The information may be provided with the intent to retrieve the information later using the same user computing device, or using a different user computing device.

In some scenarios, it may be desirable to confidentially maintain the information at the server. In these scenarios, the server may encrypt the information so that it is not viewable when stored persistently (e.g., on a hard disk). When a user wishes to access the information, the server may decrypt the information and send it to the user's computing device. In this way, the information exists at the server in unencrypted form only for purposes of encryption or for transmission back to the user's computing device. In some scenarios, it may also or alternatively be desirable to ensure that the data has not been tampered with, corrupted, or otherwise altered after it was initially provided to the server for storage. When a user later wishes to access the information, the server may load the data, perform authentication (e.g., compare the information to a hashed version that was generated upon initial receipt of the data, etc.). The server will then transmit the information only upon confirmation that the data has not been altered.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
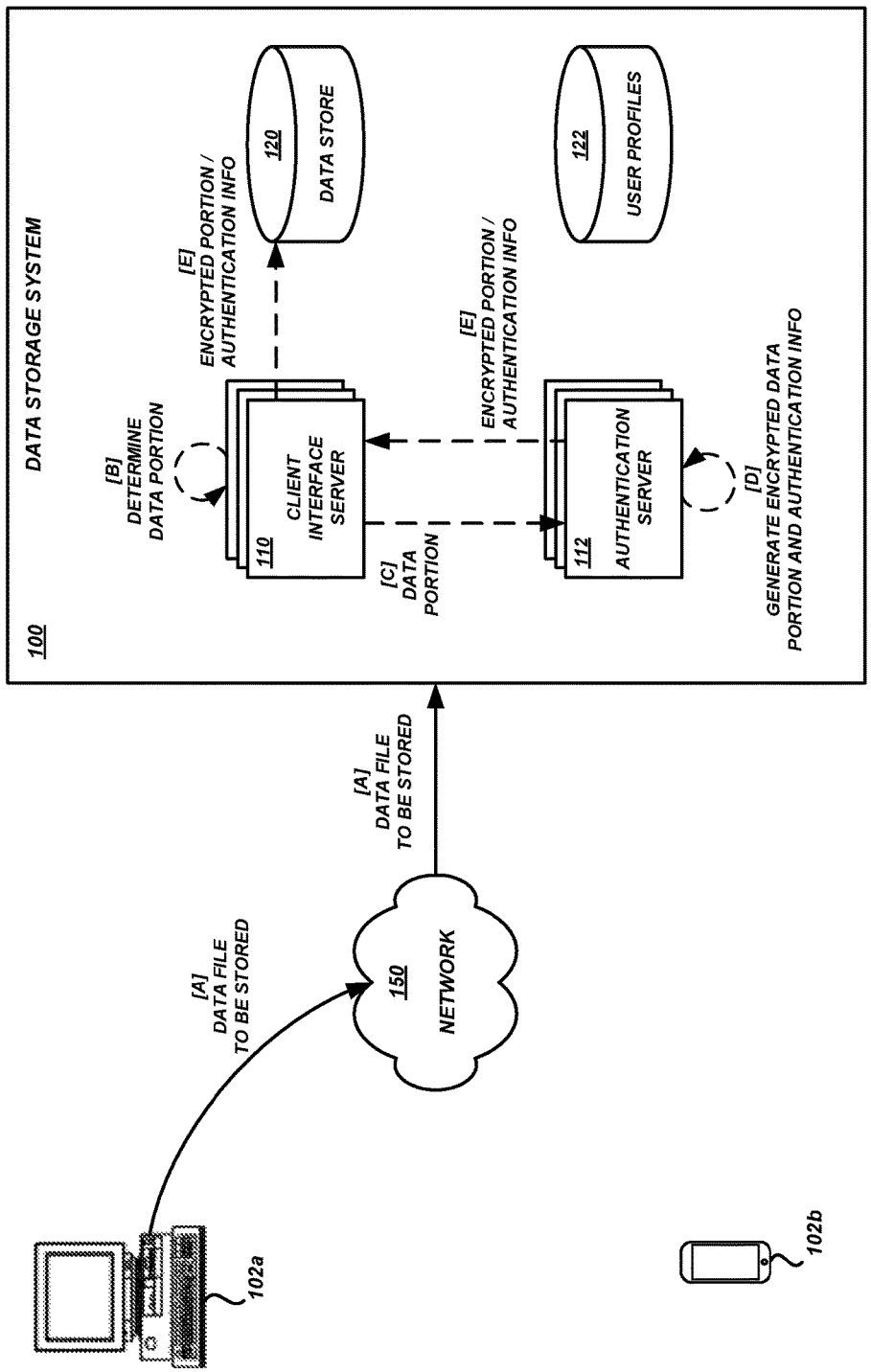
FIG. 1 is a block diagram showing illustrative interactions and data flows between a data storage system and various user devices during remote storage of encrypted information according to some embodiments.

The present disclosure is directed to a system that authenticates encrypted data in a streaming manner. Encrypting data provides confidentially by preventing the data from being properly "read" without the correct decryption key. However, encryption by itself does not ensure that the data has not been tampered with, corrupted, or otherwise altered (e.g., by a party with access to the decryption key, through alteration of the encrypted data itself, etc.). In order to verify the integrity of data (whether encrypted or unencrypted), an authentication process is used. Conventional, non-streaming methods that authenticate a data file as a single unit require the entire data file to be loaded before authentication can be performed. When large encrypted data files are processed by such conventional methods, the authentication and decryption can be time consuming or otherwise resource intensive due to the pre-loading requirement. In streaming authentication, the authentication and decryption of a large file is performed in a streaming manner, as discrete portions of the large file are loaded from storage or transmitted to other systems. Such streaming authentication improves the user-perceived responsiveness and overall performance of the system in comparison with systems using conventional, non-streaming methods, and also or alternatively reduces the total resources required to authenticate and decrypt a large file.

Some aspects of the present disclosure relate to processing a large data file as a series of discrete, sequentially-related portions, rather than processing the large data file as a single unit. A large data file may be stored as a collection of discrete, separately-encrypted portions or "chunks." Each of the separately-encrypted portions may be assigned or associated with a different sequential identifier so that the portions can be properly reassembled into a single data file after authentication and decryption. Each of the separately-encrypted portions may be associated with its own authentication data (e.g., a hashed message authentication code or an authentication tag) so that the portions can be authenticated individually, without loading the entire data file and authenticating it as a single unit. In some embodiments, in response to a request for a data file, an encrypted portion of the data file may be loaded and authenticated. Upon verifying the integrity of the encrypted portion (e.g., that it has not been altered), a decrypted version of the encrypted portion may be provided to the requesting device. Subsequently, or in parallel, another encrypted portion of the same data file may be loaded, authenticated, decrypted, and provided to the requesting device. The process may continue in a serial, parallel, or asynchronous manner. For example, the process may continue until all encrypted portions of the data file have been authenticated, decrypted, and provided to the requesting device. The requesting device may then assemble the portions into the proper sequence to recreate the original file. As another example, the process may continue until authentication of a particular encrypted portion fails. The authentication failure is indicative of an alteration to the encrypted portion after the authentication data for the encrypted portion was generated (e.g., the encrypted portion may have been corrupted, maliciously modified, or otherwise altered), and thus the authenticity of the encrypted portion can no longer be guaranteed. In such cases, the streaming authentication process may terminate, provide the requesting device with a message, mark the data file as invalid, and/or initiate some related workflow.

Additional aspects of the present disclosure relate to dynamically determining the size of the discrete portions of the data file to be encrypted and stored. In some embodiments, rather than using a default size or attempting to split a data file into a collection of evenly-sized portions, a determination can be made regarding the size of individual portions. For example, if a receiving device may process a file in a streaming manner (e.g., a video, a long text document, etc.), the data storage system may store the initial sequential portion(s) of the data file in smaller sizes than those used for subsequent portions. In this way, the data storage system may authenticate, decrypt, and provide an initial portion or subset of portions to the receiving device quickly. While the receiving device is processing or otherwise consuming the initial portion(s), the data storage system can authenticate, decrypt, and provide larger subsequent portions of the data file.

Further aspects of the present disclosure relate to receiving and processing a file in a distributed manner for storage. A user device may connect to a data storage system, and may initiate multiple parallel, sequential, or asynchronous transmissions of individual portions of a data file to the data storage system. The data storage system may include multiple separate hosts, such as multiple separate physical computing devices, multiple virtual machines on a single physical computing device, or some combination thereof. The data storage system may assign different transmissions from the user device to different physical or virtual hosts. The individual hosts may encrypt the portions of the data file that they receive without communicating with other hosts (e.g., without exchanging authentication information, encryption information, etc.). In this way, the data storage system can provide more efficient receipt and storage of incoming data files for user computing devise that have the bandwidth and other computing resources to maintain multiple transmissions. In some embodiments, the data storage system can support resumption of uploading of data files when, e.g., transmission of a single portion fails. Rather than requiring the transmission of the entire file to start from the beginning, the same host or a different host can receive the portion(s) that previously failed to be received successfully, and proceed to encrypt and store those portion(s) without requiring the entire file upload to be restarted.

Although aspects of some embodiments described in the disclosure will focus, for the purpose of illustration, on particular examples of data structures, cryptography algorithms, and authentication methods, the examples are illustrative only and are not intended to be limiting. In some embodiments, the systems and techniques described herein may be applied to other types of data structures, other cryptography algorithms, other authentication methods, or the like. For example, although the disclosure describes use of specific variants of the Advanced Encryption Standard (AES), including Cipher Block Chaining (CBC) mode and Galois/Counter Mode (GCM), other cryptography technologies may be used. As another example, although the disclosure focuses on the streaming authentication of individual large data files, the streaming authentication described herein may be applied to other physical or logical data structures, such as data objects comprising referential and/or linked resources (e.g., web pages defined by markup language files referencing embedded resources). Various aspects of the disclosure will now be described with regard to certain examples and embodiments, which are intended to illustrate but not limit the disclosure.

Network-Based Data Storage System

With reference to an illustrative embodiment, FIG. 1 shows a network environment in which aspects of the present disclosure may be implemented. As shown, the network environment may include a data storage system 100 and various user devices 102a and 102b (collectively "user devices 102"). The user devices 102 and data storage system 100 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or a combination thereof, some or all of which may or may not have access to and/or from the Internet.

The data storage system 100 may include various components for providing the features described herein. Illustratively, the data storage system 100 may include a client interface server 110 configured to receive data from user devices 102 for storage at the data storage system, and/or to provide stored data to user devices 102. The data storage system 100 may also include an authentication server 112 configured to generate encrypted data and authentication data, and/or to authenticate and decrypt the encrypted data.

The data storage system 100 may also include various data stores to store—and support storage of—data for user devices 102. For example, the data storage system 100 may include a data store 120 to store encrypted portions of data files, entire encrypted data files, authentication information associated with the stored data, keys for decrypting stored encrypted data, etc. The data storage system 100 may also include a user profiles data store 122 to store data about the users for whom the data storage system 100 is storing data.

The data stores and other components of the data storage system 100 shown in FIG. 1 and described herein are illustrative only, and are not intended to be limiting. In some embodiments, fewer, additional, and/or alternative data stores and/or components may be implemented by the data storage system 100.

The data storage system 100 may be implemented on one or more physical server computing devices that provide computing services and resources. In some embodiments, the data storage system 100 (or individual components thereof, such as the client interface server 110, authentication server 112, data store 120, user profiles data store 122, etc.) may be implemented on one or more host devices, such as blade servers, midrange computing devices, mainframe computers, desktop computers, or any other computing device configured to provide computing services and resources. For example, a single host device may execute one or more client interface servers 110, authentication servers 112, data stores 120, user profiles data stores 122, some combination thereof, etc. The data storage system 100 may include any number of such hosts. As another example, any or all of the functionality described herein with respect to separate client interface servers 110, authentication servers 112, data stores, etc. may be implemented as a single physical or logical system, rather than as separate physical or logical components.

In some embodiments, the features and services provided by the data storage system 100 may be implemented as web services consumable via the communication network 150. In further embodiments, the data storage system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

The individual user devices 102a, 102b may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device 102 to provide data to and/or access data from the data storage system 100 and/or to perform other computing tasks. In some embodiments, a user may launch specialized application software, such as a mobile application, or general application software, such as a browser application, to provide data to and/or access data form the data storage system 100 and/or to perform other computing tasks.

In one illustrative embodiment, a user of a user device 102a may wish to store a data file at the data storage system 100. For example, the user may wish to back up the contents of a hard drive of the user device 102a, store a large file (e.g., a video file, database file, etc.) to be accessed by the user device 102a or another user device 102b, etc.

The data file may have a particular logical or physical structure that is to be preserved or able to be restored when the data file is later retrieved by the user device 102a (or some other device). If the data within the data file is not arranged in a particular manner, the data file may cause inaccuracies, or may become altogether unusable. In some embodiments, the data file may include sequential data, such as bits or other portions that are arranged in a specific sequence. The sequential arrangement of the data file contents may be important for use of the file. In some embodiments, an application that is used to load or process the data file may only be able to successfully do so if the contents of the data file are arranged in a particular expected sequence. For example, a video file may include data regarding frames of video. The data for an individual frame may be grouped together or otherwise arranged in a particular manner, data for sequences of frames may be arranged sequentially or in a particular manner, etc. As another example, a text file may include sequences of bits representing alphanumeric characters. The specific sequence or arrangement of bits within the file may correspond to the sequence or arrangement of alphanumeric characters such that the characters can be understood as words or other strings in which the sequence of the characters is important. As yet another example, a backup file may include data regarding checkpoints in time for stored data, differential data that may be applied to the checkpoints, etc. The specific sequence or arrangement of data within the backup file may correspond to the order of the checkpoints or differentials, may represent underlying sequential data that is backed up, etc.

Figure 3:
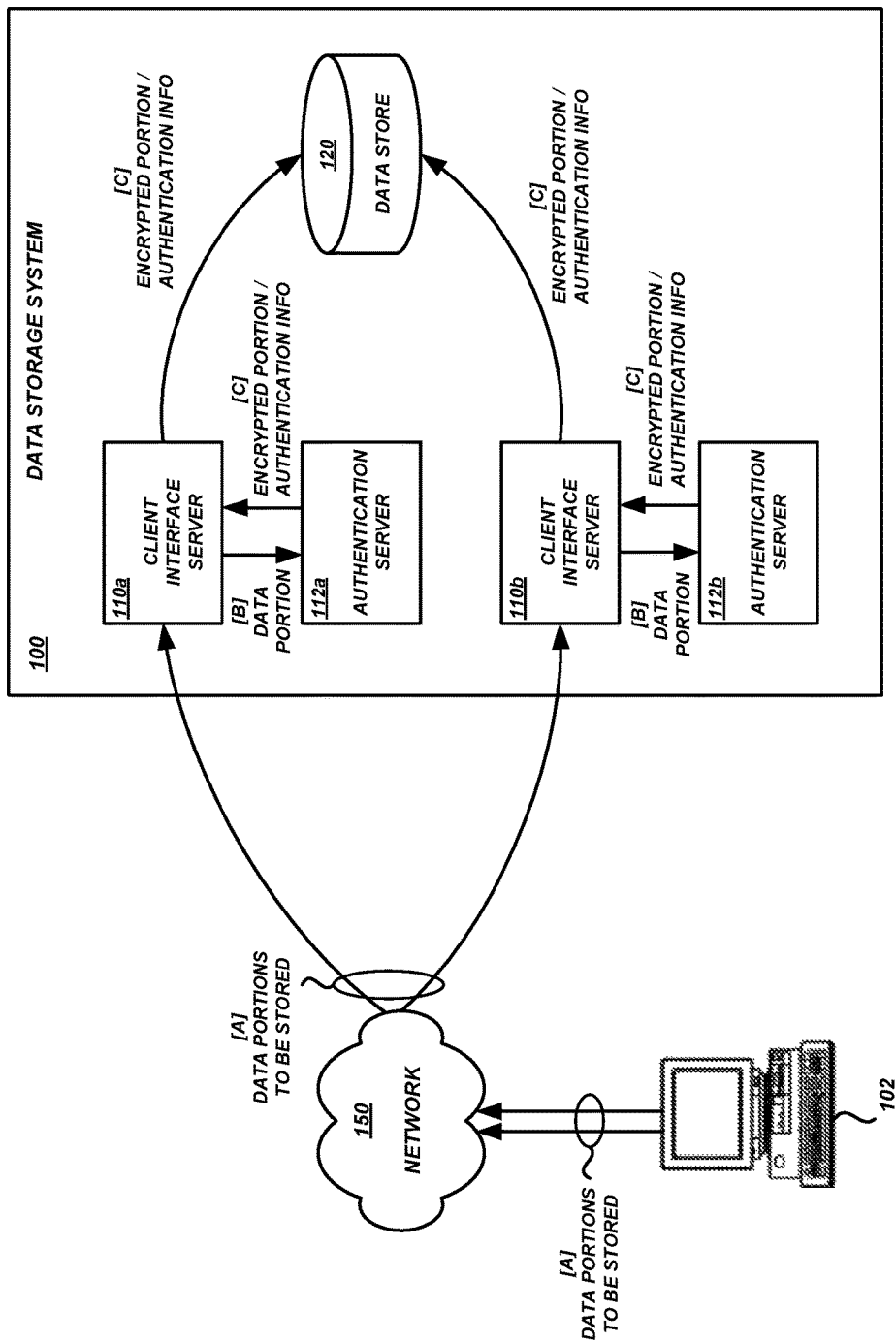
FIG. 3 is a block diagram showing illustrative interactions and data flows between a data storage system and a user device during distributed encryption and remote storage of encrypted information according to some embodiments.

As shown in FIG. 1, at [A] the user device 102a can transmit the data file to the data storage system 100 via a network 150. The user device 102a may transmit the file in a single transmission, such as a streaming transmission of a sequential stream of data to the data storage system 100 such that the data storage system 100 receives the bits of the data file in substantially the order in which they are to be stored (accounting for variations due to packet-switching that are reconciled via standard low-level network communication protocols). In some embodiments, the user device 102a may partition the data file into individual portions that are to be processed separately by the data storage system 100 (e.g., each portion is to be encrypted and stored separately). The user device 102a may provide each portion (or subsets thereof) with sequence identifiers or other data indicating the order in which the portions are to be arranged when reassembling the entire data file. In some embodiments, the user device 102a may establish multiple, separate transmissions of different portions of the data file, potentially in parallel or asynchronously using multiple different connections. FIG. 3 illustrates an example implementation.

The user device 102a may execute application software to provide for the selection of data and transmission of the data to the data storage system 100. For example, the user device 102a may execute a browser application. The browser application may provide a web-based user interface to facilitate interactions with the data storage system 100, such as a web page, applet, plugin, extension, etc. (whether received from the data storage system 100 or some other source). As another example, the user device 102a may execute a specialized application, such as an application configured to interface with the data storage system 100 without first requiring retrieval and display of a web page or other network resource. As yet another example, the user device 102a may execute an operating system that provides built-in features for transmission of data files to the data storage system 100. In these and other examples, a user may perform various operations to initiate data file storage. Illustratively, the user may select a particular data file to be transmitted interactively, schedule transmission of a data file, or define certain rules regarding which data file(s) to transmit to which data storage system(s) 100, and under what circumstances the transmission(s) is/are to occur.

At [B], a client interface server 110 can receive the data file from the user device 102a and determine individual portions of the data file to begin processing for storage. In some embodiments, the client interface server 110 may determine how to partition the data file into portions based on default size requirements. For example, the client interface server 110 may implement a default portion size (e.g., 5 mB). Each data file may be partitioned into n portions, where n=total size of the data file/default size of each portion. If the last portion includes less data than the default size, it may be padded (e.g., placeholder data may be added to reach the full default size), stored as a portion with less than the default size, combined with the second-to-last portion to make a portion with greater than the default size, etc. In some embodiments, the client interface server 110 may split each data file into the same number of portions, such that different data files may have portions of different "default" sizes. In some embodiments, a combination of the above approaches may be used. Data files may be partitioned into portions each having a default portion size, unless the total number of portions would exceed some threshold (e.g., 10,000). In that case, the default size may be scaled up to keep the total number of portions at or below the threshold. In some embodiments, the size of all portions of a data file, or for individual portions of the data file, may be determined dynamically. For example, the sizes of individual portions may be determined differently based on characteristics of the data file itself or its use, as described in greater detail below. In some embodiments, the data file may already be partitioned into portions by the user device 102a, and may be received by the client interface server 110 as a set of separate portions.

At [C], the client interface server 110 can provide a data portion to an authentication server 112. At [D], the authentication server 112 can prepare the data portion for storage by encrypting the data portion and generating authentication data. The data portion can be encrypted to provide confidentiality for the data (e.g., to prevent unauthorized parties from accessing the underlying data). Authentication information can be generated so that later, when the data file is to be provided to an authorized party, the integrity of the data can be verified (e.g., the authentication server 112 can verify that the data has not been corrupted or otherwise altered). Authentication typically involves generating a message authentication code (MAC), such as a hashed message authentication code (HMAC) or other information from the encrypted data or from the underlying unencrypted data. When the integrity of the data is to be verified later, the HMAC or other authentication information can be compared to the corresponding encrypted or unencrypted data, and any difference can be determined. If there is a difference, then the integrity of the data cannot be guaranteed. If there is no difference, then the integrity of the data can be verified to an extremely high degree of confidence. In some embodiments, the encryption and generation of authentication information are performed as two separate steps using two separate algorithms or components, resulting in two separate pieces of data (e.g., an encrypted data portion, and a separate HMAC). In some embodiments, the two operations may be performed as one authenticated encryption process, resulting in one piece of data (e.g., an encrypted data portion with embedded authentication information). Various algorithms and components for encryption and/or generation of authentication information are described in greater detail below with respect to FIGS. 4 and 5.

At [E], the authentication server 112 may provide the encrypted data portion and authentication information (either separately or as one composite data structure) to the client interface 112, which can store the encrypted data portion and authentication information in the data store 120. In some embodiments, the client interface server 110 may store the encrypted data portion and authentication information with sequence data. For example, the sequence data can indicate the sequence of the data portion within all data portions of the data file, so that the data file can be reassembled in the proper sequence later.

The client interface server 110 and authentication server 112 may repeat the operations marked [B], [C], [D], and/or [E], as needed, for each remaining portion of the data file to be stored.

Figure 2A:
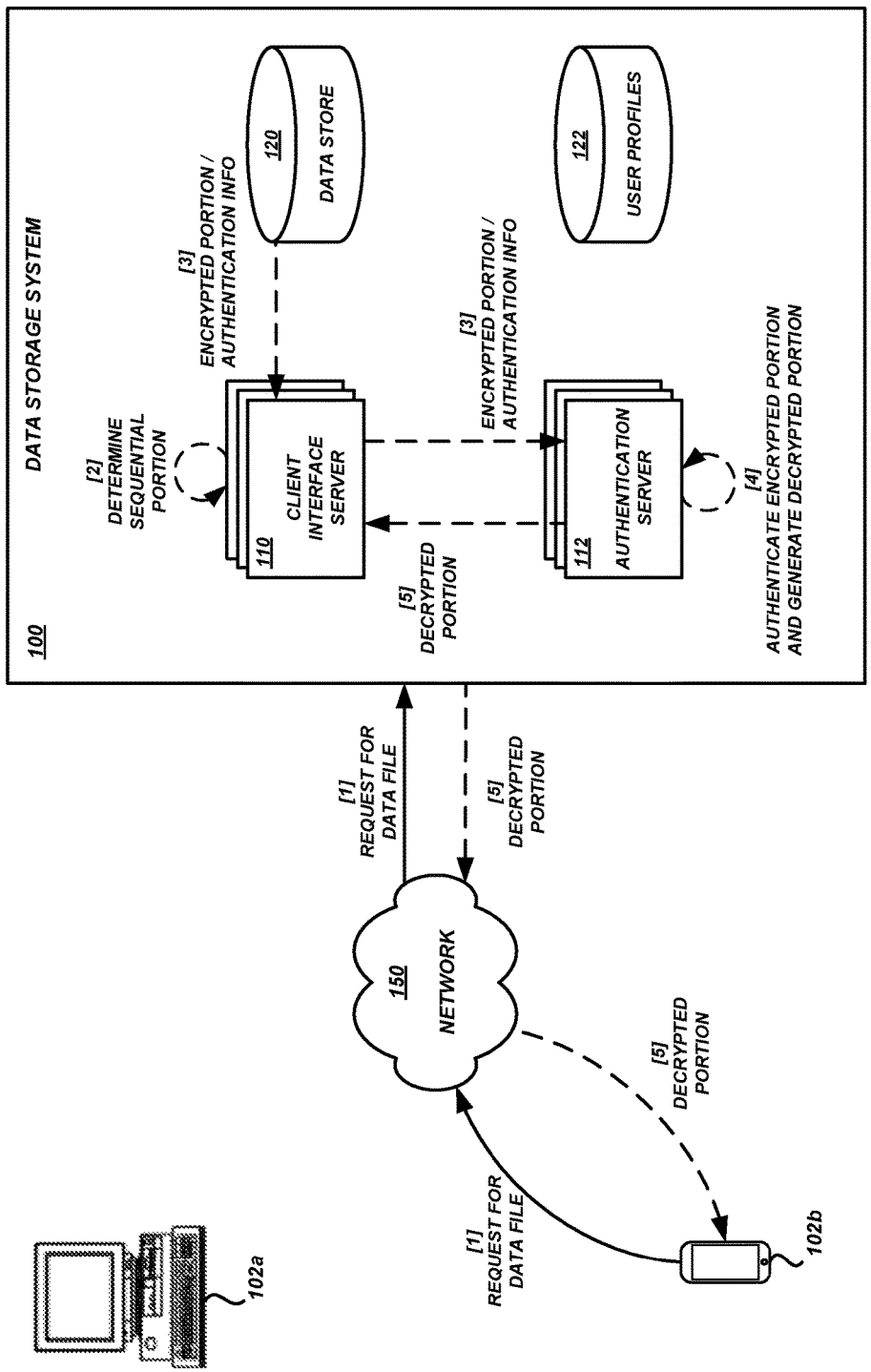
FIG. 2A is a block diagram showing illustrative interactions and data flows between a data storage system and various user devices during authentication and retrieval of encrypted information according to some embodiments.
Figure 2B:
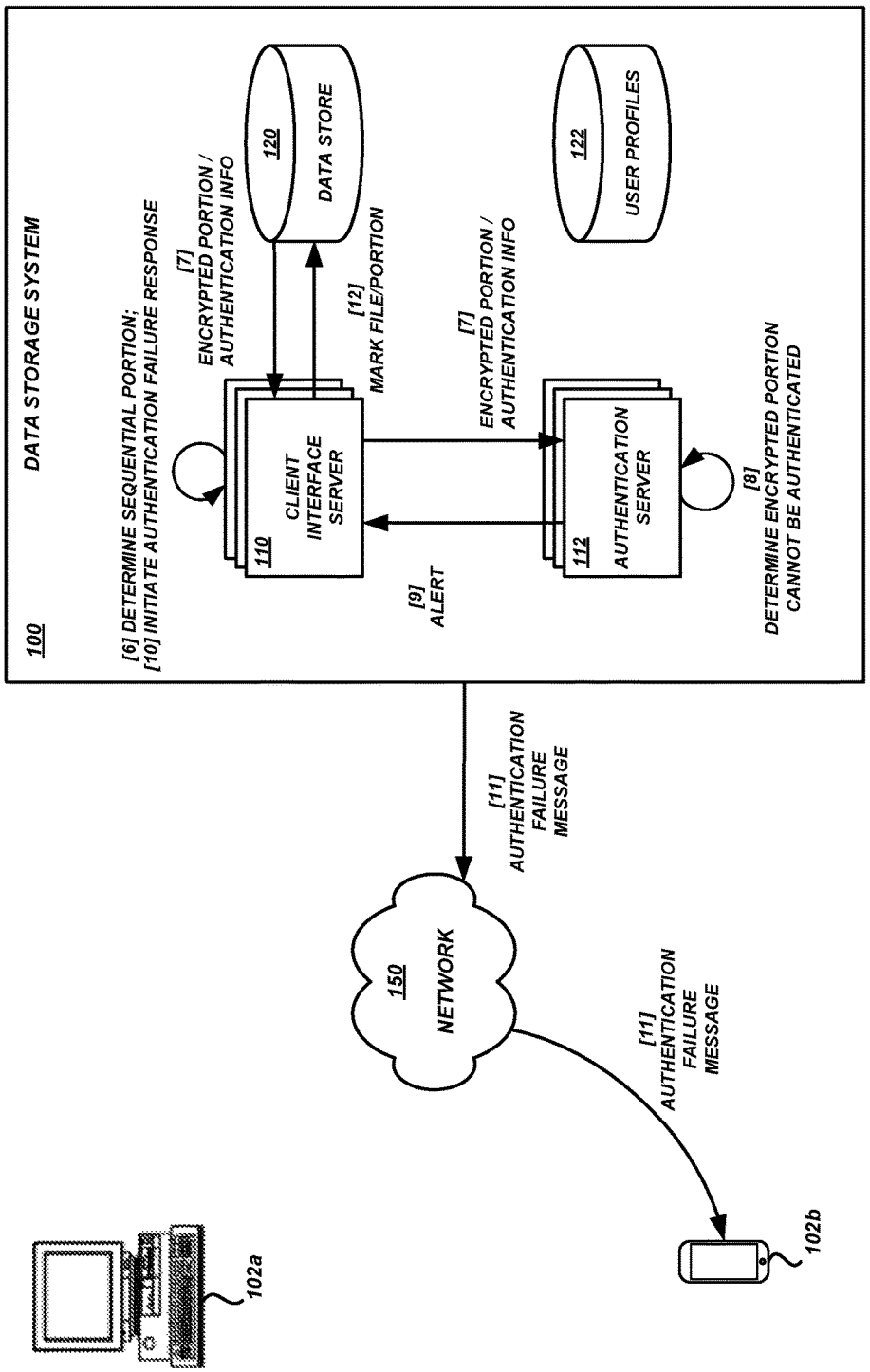
FIG. 2B is a block diagram showing illustrative interactions and data flows between a data storage system and various user devices during a failure to authenticate encrypted information according to some embodiments.

After storage of the data file at the data storage system 100, a user may wish to access the data file. In some embodiments, the user may access the data file from a different user device 102b than the user device 102a from which the data file was originally sent to the data storage system 100. FIGS. 2A and 2B illustrate example interactions and data flows between the user device 102b and the data storage system 100 during streaming authentication and retrieval of a stored data file. Although FIGS. 2A and 2B illustrate a different user device 102b requesting and receiving the data file, the illustration is for example only, and is not intended to be limiting. In some embodiments, the same user device 102a that previously sent the data file to the data storage system 100 may access the data file. In some embodiments, multiple user devices 102 may access the data file asynchronously or concurrently. Access to the data file may be based on user-specific credentials, such as those stored in connection with a user profile in the user profile data store 122.

As shown in FIG. 2A at [1], a user device 102b may send a request for a data file to the data storage system 100, where a client interface server 110 may receive and process the request. At [2], the client interface server 110 may determine a particular sequential portion of the data file to retrieve and begin processing. In some embodiments, the request may be associated with a data file identifier. The client interface server 110 can use the data file identifier to initiate retrieval of an encrypted portion (and corresponding authentication information) from the data store 120, and provision of the encrypted portion (and corresponding authentication information) to the authentication server 112 at [3]. The "first" data portion of the data file may be the first portion sequentially, or it may merely be the first portion retrieved from the data sore 120. In implementations where the client interface server 110 provides decrypted, authenticated data portions to the user device 102b in any order, the client interface server 110 may provide sequence information in association with individual portions so that the user device 102b can reassemble the data portions in the proper arrangement to recreate the data file.

At [4], the authentication server 112 can decrypt and authenticate the encrypted data portion. Decryption of the encrypted data portion is performed to recover the underlying data that forms a part of the requested data file. Authentication of the encrypted data portion is performed to verify that the data portion has not been altered in the time since the authentication data was originally generated. Upon verifying the integrity of the data portion (whether encrypted or decrypted), the authentication server 112 can provide the decrypted portion to client interface server 110 and on to the user device 102b at [5].

The client interface server 110 and authentication server 112 may repeat the operations marked [2], [3], [4], and/or [5], as needed, for each remaining portion of the data file to be provided to the user device 102b. In some cases, the authentication server 112 may not be able to verify the integrity of a particular data portion. In such cases, additional and/or alternative operations may be performed as shown in FIG. 2B.

As shown in FIG. 2B, a sequential portion may be identified at [6], and then retrieved from the data store 120 and provided to the authentication server at [7]. The operations may be performed as described above with respect to operations [2] and [3]. For example, the operations may be performed on the first portion of the requested data file, the last portion of the requested data file, or any portion in between. However, instead of successfully verifying the integrity of the data portion, the authentication server 112 may be unable to verify the integrity of the particular data portion at [8]. The authentication failure may be caused by, e.g., corruption of the data in the data store 120, tampering with the data after it was encrypted and/or after the authentication information was generated, or by some other alteration. In these cases, rather than provide altered and potentially malicious or erroneous data back to the client interface server 110 for transmission to the user device 102b, the authentication server 112 can instead provide a message or alert at [9] indicating that the authentication of the data portion failed.

At [10], the client interface service can initiate an authentication failure response. In some embodiments, the response may include transmission of an authentication failure message to the requesting user device 102b, cancellation of transmission of the data file to the user device 102b, closing the connection to the user device 102b, marking the data file or the specific data portion as invalid in the data store 120, initiating a recovery process to restore a backup of the data file or specific portion, some combination thereof, or initiation of some other workflow.

FIG. 3 illustrates interactions and data flows between a user device 102 and a data storage system 100 when the user device 102 provides a data file in multiple separate transmissions. As shown, the different transmissions may be received by different client interface servers 110a, 110b and encrypted by different authentication servers 112a, 112b at the data storage system 100, and therefore each encryption and authentication process is performed independently (e.g., without synchronizing cipher state information between the different servers performing the processes).

At [A], and the user device 102 can transmit data portions to the data storage system 100 via the network 150. The data portions may be portions of a data file, and the user device 102 may partition the data file into multiple portions using, e.g., one of the partitioning processes described above. In some embodiments, the user device 102 may establish multiple separate connections with the data storage system 100. At least some of the connections may be to different servers within the data storage system 100. For example, as shown, one connection may be to a first client interface server 110a, and one may be to a second client interface server 110b. The connections may be established and/or data portions may be transmitted serially, in parallel, or asynchronously.

At [B], the client interface servers can provide the data portions that they have received to authentication servers 112a and 112b, respectively. Each authentication server 112a, 112b can then encrypt their respective data portions, generate authentication information, etc. at [C] and the output can be stored in the data store 120. In some cases, the output may be stored in different data stores 120. Advantageously, because the data portions are to later be decrypted and authenticated in a streaming but discrete manner, they may be encrypted and stored independently, without the various authentication servers 112a, 112b exchanging counters, cipher states, etc. The encrypted portions may be stored with sequence data indicating, e.g., the proper original location of each portion within the data file. The sequence data may be provided by the user device 102, derived by the client interface servers 110a, 110b, etc. For storage, the sequence data may be embedded within the encrypted portions (e.g., appended onto the encrypted data), or stored in the data store 120 in association with the corresponding encrypted data portions.

Example Process for Storing Data for Streaming Authentication

Figure 4:
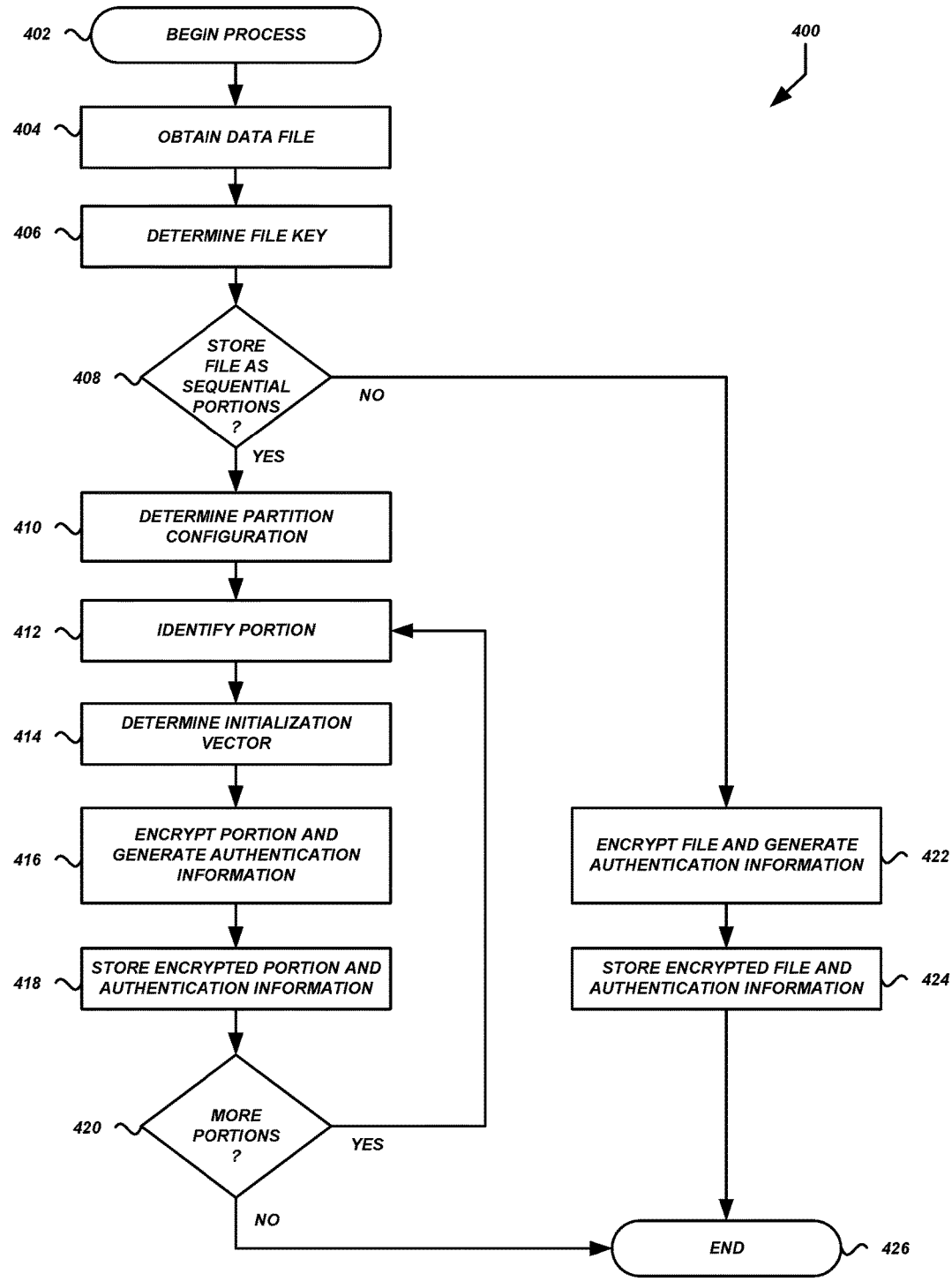
FIG. 4 is a flow diagram of an illustrative process for storing data as a set of encrypted sequential portions according to some embodiments.

FIG. 4 is a flow diagram of an illustrative process 400 that may be executed by a data storage system 100 to store data files so that they may later be accessed using streaming authentication. Advantageously, a client interface server 110, authentication server 112, and/or various other components of a data storage system 100 may implement the process 400 to store data files as sets of sequence-based, discrete portions. In this way, the portions can be separately authenticated and arranged back into the original data files from which they were partitioned.

The process 400 shown in FIG. 4 begins at block 402. The process 400 may begin in response to an event, such as when a storage request or command is received from a user device 102. When the process 400 is initiated, a set of executable program instructions stored on one or more non-transitory computer-readable media (e.g., hard drive, flash memory, removable media, etc.) may be loaded into memory (e.g., random access memory or "RAM") of a computing device of the data storage system 100, such as the computing device 600 shown in FIG. 6. The executable instructions may then be executed by a hardware-based computer processor (e.g., a central processing unit or "CPU") of the computing device. In some embodiments, the process 400 or portions thereof may be implemented on multiple processors, serially or in parallel.

At block 404, a client interface server 110 or some other module or component of the data storage system 100 can obtain a data file, or portions thereof, for storage. As described above, the data file may be obtained as a single file, or as a set of pre-partitioned portions.

At block 406, a client interface server 110 or some other module or component of the data storage system 100 can determine a file-level key for encryption and storage of the portions of the data file. In some embodiments, a new file-level key may be determined each time a new file is received for storage. For example, a pseudo-random number generator may be initialized and used to generate a random file-level key of some predetermined or dynamically determined length, depending upon the specific encryption and authentication algorithm being used.

At decision block 408, a client interface server 110 or some other module or component of the data storage system 100 can determine whether to store the data file as a set of sequential but discrete portions, or whether to store the date file as a single unit. In some embodiments, the size of the data file may be evaluated with respect to a threshold. If the size of the data file satisfies the threshold (e.g., meets or exceeds the threshold size), then the data file may be stored as a series of sequential but discrete portions. Otherwise, if the size of the data file fails to satisfy the threshold, the data file may be stored as a single unit.

At block 410, a client interface server 110 or some other module or component of the data storage system 100 can determine the partition configuration for the data file. The partition configuration may be used to specify certain characteristics about how the data file is to be partitioned and stored. In some embodiments, the partition configuration may specify that the data file is to be partitioned into equal-sized portions of some default size, into some number of portions, or some combination thereof. In some embodiments, the partition configuration may be determined dynamically, based on one or more rules. For example, if the data file is of a type that will be consumed in a latency-sensitive manner (e.g., a video file), then a partition configuration may specify that the initial portions of the file (e.g., portions corresponding to the first x frames, where x is a positive number) are to be of a smaller size than subsequent portions of the file (portions corresponding to a set of y frames, where y>>x) so that the initial portions can be consumed more quickly and latency can be reduced. As another example, if the data to be stored is a set of related resources (e.g., a web page defined by a markup language file referencing embedded resources such as images, videos, scripts, etc.), then a partition configuration may specify that an initial portion is to include a certain resource (e.g., the markup language file), and subsequent portions are to include other resources (e.g., referenced/embedded resources). As yet another example, if the data to be stored includes a collection (e.g., a set of records), then a partition configuration may specify that each portion (or some subset thereof) is to include a certain number of objects in the collection (e.g., a certain number of records). Thus, the portions may have the same number of records. In this example, the portions may be the same or different sizes, depending upon the particular data structures used for the records, how records in the collection are related, etc.

At block 412, a client interface server 110 or some other module or component of the data storage system 100 can identify a first portion of the data file to be stored. The client interface server 110 may use the partition configuration and the data file itself to partition a first portion and send it to the authentication server 112. In some embodiments, the first portion may be provided by the user device 102, already partitioned.

At block 414, an authentication server 112 or some other module or component of the data storage system 100 can determine an initialization vector for encrypting the current portion of the data file. For example, some encryption algorithms (AES in CBC or GCM mode) can use multiple keys to encrypt data. In some embodiments, it may be desirable or required to use a shared file-level key as a first key for encrypting each portion of the data file, and also a unique or otherwise non-shared portion-level initialization vector. In such embodiments, each time a new portion is prepared for encryption, a new portion-level initialization vector may be generated. The portion-level initialization vector may be a nonce or other data generated using a pseudo-random algorithm. In one specific, non-limiting embodiment, data files may be partitioned into 5 mB portions, and each portion may be associated with a different 96-bit initialization vector. The specific size of the initialization vector may be chosen such that it does not require a significant amount of additional storage space in comparison with its corresponding portion. In some embodiments, rather than using a shared file-level key, a separate portion-level key may be used. For example, the authentication server 112 may use both a portion-level key and a portion-level initialization vector, each specific to the portion to be encrypted/decrypted. In these embodiments, the determination of the file-level key at block 406 may in some cases be omitted.

At block 416, an authentication server 112 or some other module or component of the data storage system 100 can encrypt the current portion of the data file and generate corresponding authentication information. Depending upon the specific encryption and authentication algorithms being used, the encryption of the current portion and the generation of corresponding authentication information may be performed as separate processes, or may be performed in a single process. In some embodiments, an authenticated encryption algorithm may be used (e.g., AES in its GCM mode of operation). The authenticated encryption algorithm may use the file-level key, the portion-level initialization vector, and the portion itself to generate an encrypted data portion. In addition, authentication information (e.g., information about the internal state of the encryption cipher after encrypting the data portion) may be stored in connection with the encrypted data portion for later use in authenticating the encrypted data portion, as described below. In some embodiments, separate encryption and authentication algorithms may be used. An encryption algorithm (e.g., AES in its CBC mode of operation) may use the file-level key, the portion-level initialization vector, and the portion itself to generate an encrypted data portion. A separate authentication algorithm (e.g., Secure Hash Algorithm 256, or SHA-256) may be used to compute a hash (e.g., an HMAC) of either the unencrypted data portion or the encrypted data portion. The HMAC will serve as the authentication information for later use in authenticating the encrypted data portion, as described below.

At block 418, a client server 110 or some other module or component of the data storage system 100 can store the encrypted portion and its corresponding authentication information. In some embodiments, the encrypted portion and corresponding authentication information, portion-level initialization vector, and/or sequence information may be stored as separate data items, while in some embodiments the corresponding authentication information, portion-level initialization vector, and/or sequence information may be embedded within or appended to the encrypted portion.

At decision block 420, a client server 110 or some other module or component of the data storage system 100 can determine whether there are additional portions of the data file to be processed for storage. If there are any additional portions, the process 400 can return to block 412 as needed. If there are no additional portions, the process 400 may terminate at block 426.

At block 422, an authentication server 112 or some other module or component of the data storage system 100 can encrypt the entire data file after it is determined at block 408 not to store the data file as discrete portions. The authentication server 112 may encrypt the data file and generate authentication information as described above with respect to the individual portions.

At block 424, a client server 110 or some other module or component of the data storage system 100 can store the encrypted data file and its corresponding authentication information. The client server 110 may store the encrypted data and corresponding authentication information as described above with respect to the individual portions.

Example Process for Streaming Authentication

Figure 5:
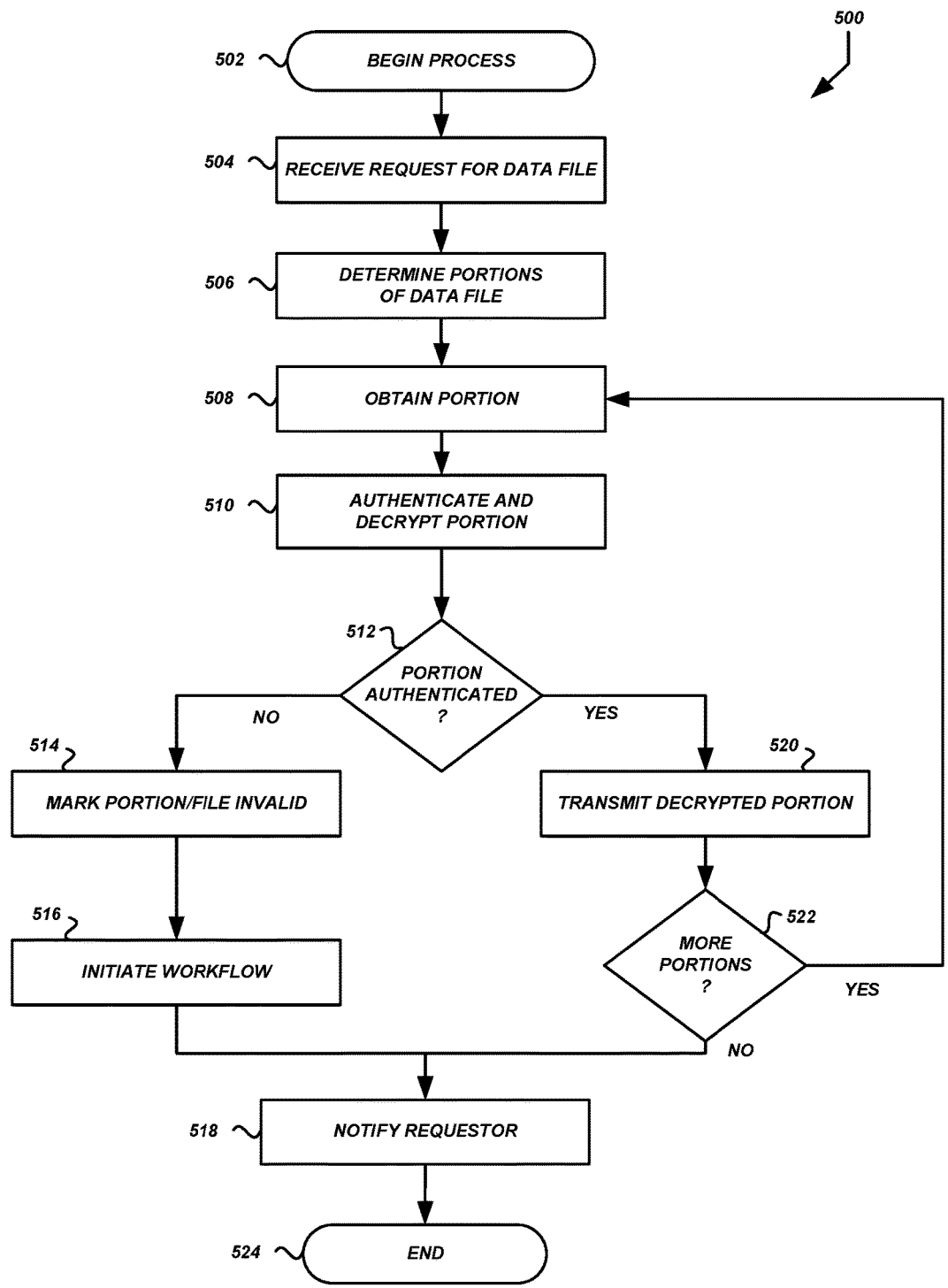
FIG. 5 is a flow diagram of an illustrative process for streaming authentication of data previously stored as a set of encrypted sequential portions according to some embodiments.

FIG. 5 is a flow diagram of an illustrative process 500 that may be executed by a data storage system 100 to provide data files using streaming authentication. Advantageously, a client interface server 110, authentication server 112, and/or various other components of a data storage system 100 may implement the process 500 to authenticate discrete portions of the data file in an ongoing manner after transmission of other authenticated portions of the same data file.

The process 500 shown in FIG. 5 begins at block 502. The process 500 may begin in response to an event, such as when a request for a data file is received from a user device 102. When the process 500 is initiated, a set of executable program instructions stored on one or more non-transitory computer-readable media (e.g., hard drive, flash memory, removable media, etc.) may be loaded into memory (e.g., random access memory or "RAM") of a computing device of the data storage system 100, such as the computing device 600 shown in FIG. 6. The executable instructions may then be executed by a hardware-based computer processor (e.g., a central processing unit or "CPU") of the computing device. In some embodiments, the process 500 or portions thereof may be implemented on multiple processors, serially or in parallel.

At block 504, a client interface server 110 or some other module or component of the data storage system 100 can receive a request from a user device 102 for a data file. In some embodiments, the request may be associated with a file identifier, a user profile identifier, etc. In some embodiments, the client interface server 110 may determine whether the request has been received from an authorized user or user device 102 before proceeding with retrieval and streaming authentication. For example, the client interface server 110 may access the user profiles data store 122 to determine whether the request and the file are both associated with the same user profile.

At block 506, a client interface server 110 or some other module or component of the data storage system 100 can determine portions of the data file to retrieve. In some embodiments, the client interface server 110 may determine the portions based on information stored in the data store 120 in connection with, e.g., a file identifier and/or a user profile identifier.

At block 508, a client interface server 110 or some other module or component of the data storage system 100 can obtain an encrypted portion of the data file for processing. In some embodiments, the client interface server 110 may retrieve the encrypted data portion that is stored in the data store 120 in connection with, e.g., the file identifier and a sequence identifier that corresponds to the first encrypted data portion of the file. The client interface server 110 may also obtain the file-level key, and any other related information to be used for streaming authentication (e.g., a portion-level initialization vector, authentication information for the portion, etc.).

At block 510, an authentication server 112 or some other module or component of the data storage system 100 can authenticate and decrypt the current encrypted data portion. Depending upon the specific decryption and authentication algorithms being used, the decryption and authentication of the current encrypted portion may be performed as separate processes, or may be performed in a single process. In some embodiments, an authenticated decryption algorithm may be used (e.g., AES in its GCM mode of operation). The authenticated decryption algorithm may use the file-level key, the portion-level initialization vector, and the encrypted data portion itself to generate or recover the data portion. In addition, authentication information (e.g., information about the internal state of the encryption cipher when the encrypted portion was generated) may be obtained for use in verifying the integrity of the data portion. In some embodiments, separate decryption and authentication algorithms may be used. A decryption algorithm (e.g., AES in its CBC mode of operation) may use the file-level key, the portion-level initialization vector, and the encrypted data portion itself to generate or recover the data portion. A separate authentication algorithm (e.g., Secure Hash Algorithm 256, or SHA-256) may be used to compute a hash (e.g., an HMAC) of either the decrypted data portion or the encrypted data portion. The HMAC will serve as the authentication information for use in authenticating the data portion.

At decision block 512, an authentication server 112 or some other module or component of the data storage system 100 can determine whether the integrity of the portion can be verified. For example, the authentication server 112 can compare the authentication information determined above in block 510 to authentication information generated prior to storage of the data portion. If the authentication information determined above matches the authentication information generated prior to storage of the data portion, the authentication server 112 can authenticate the data portion, and the process 500 can proceed to bock 520. If the authentication information determined above does not match the authentication information generated prior to storage of the data portion, the authentication server 112 cannot authenticate the data portion, and the process 500 can proceed to bock 514.

At block 514, a client interface server 110 or some other module or component of the data storage system 100 can mark the file or current portion of the file as being invalid. This may be done so that subsequent processes can more easily access the invalid portion or file, so that subsequent requests for the file or portion can be rejected or handled, etc.

At block 516, a client interface server 110 or some other module or component of the data storage system 100 can initiate a workflow to handle the invalid data portion. In some embodiments, the workflow may include a recovery operation to recover a backup of the invalid data portion or the entire data file. In some embodiments, the workflow may include notifying administrators or other personnel, initiating other processes, etc.

At block 518, a client interface server 110 or some other module or component of the data storage system 100 can notify the requestor of the failure to authenticate the data portion or the data file. For example, the client interface server 110 can transmit a message to the client device that the requested data file could not be authenticated. In some embodiments, the client interface server 110 may also or alternatively cancel transmission of the requested file, close the connection to the user device 102, etc.

At block 520, a client interface server 110 or some other module or component of the data storage system 100 can transmit the decrypted data portion to the requesting user device after authenticating the portion as described above. In some embodiments, the decrypted portion may be transmitted in connection with sequence data that indicates the proper ordinal location in which the decrypted portion is to be placed when assembling the data file at the user device.

At block 518, a client interface server 110 or some other module or component of the data storage system 100 can notify the requestor of the failure to authenticate the data portion or the data file. For example, the client interface server 110 can transmit a message to the client device that the requested data file could not be authenticated. In some embodiments, the client interface server 110 may also or alternatively cancel transmission of the requested file, close the connection to the user device 102, etc.

At decision block 522, a client server 110 or some other module or component of the data storage system 100 can determine whether there are additional portions of the data file to be authenticated and provided to the user device 102. If there are any additional portions, the process 500 can return to block 508 as needed. If there are no additional portions, the process 500 may terminate at block 524.

At block 518, a client interface server 110 or some other module or component of the data storage system 100 can notify the requestor of the completed authentication of the file.

Execution Environment

Figure 6:
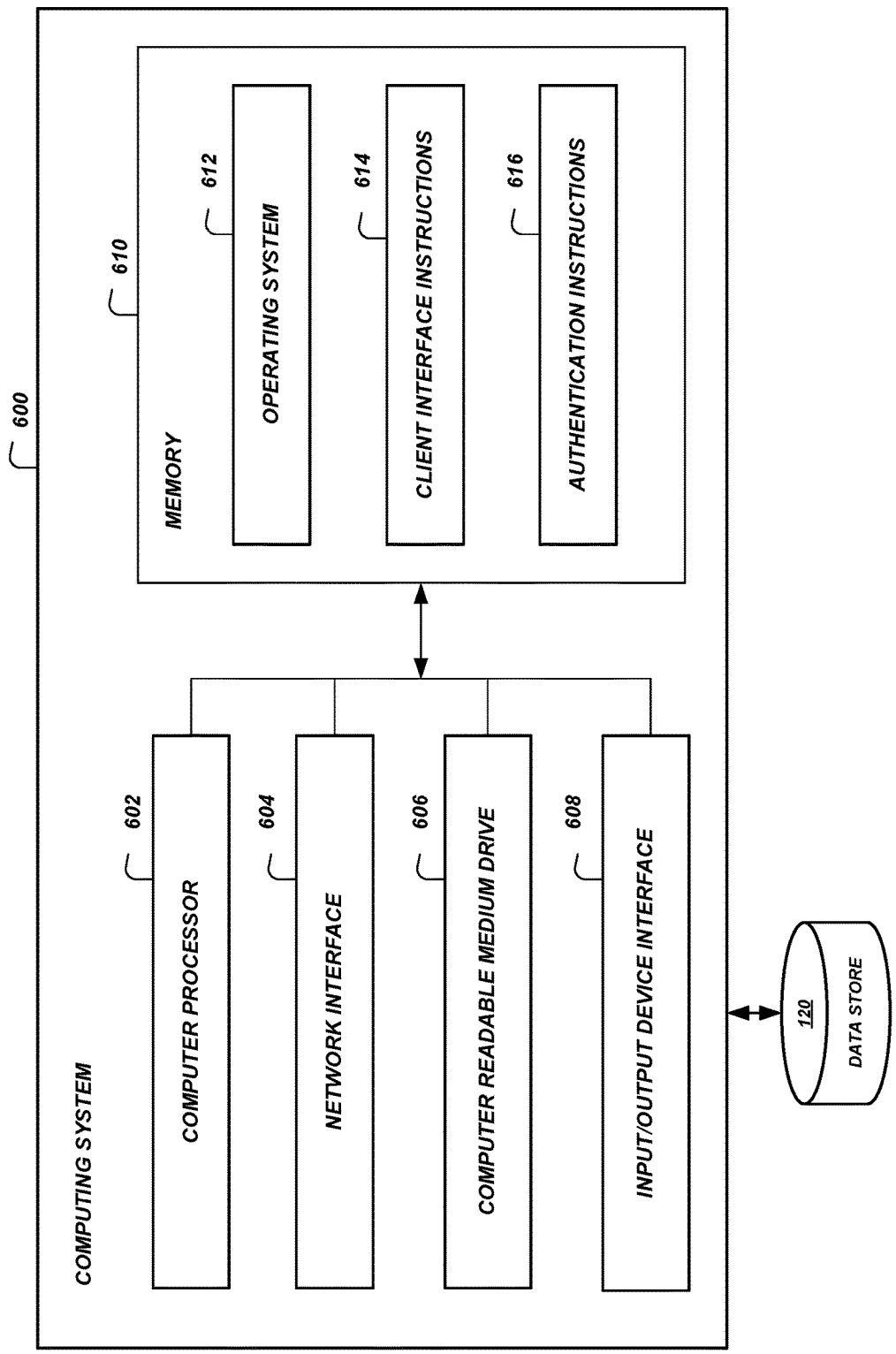
FIG. 6 is a block diagram of an illustrative computing device configured to implement streaming authentication according to some embodiments.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as high density disk drives ("HDDs"), solid state drives ("SDDs"), flash drives, and/or other persistent non-transitory computer-readable media; an input/output device interface 608, such as an IO interface in communication with one or more external storage drives; and one or more computer readable memories 610, such as random access memory ("RAM") and/or other volatile non-transitory computer-readable media.

The network interface 604 can provide connectivity to one or more networks or computing systems, such as a data store 120. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure. For example, in one embodiment, the computer-readable memory 610 may include a set of client interface instructions 614 that implement the processes 400 and/or 500 described above (or portions thereof). As another example, the computer-readable memory 610 may also or alternatively include a set of authentication instructions 616 that implement the processes 400 and/or 500 described above (or portions thereof).

In some embodiments, multiple computing systems 600 may communicate with each other via their respective network interfaces 604, and can implement data storage or streaming authentication independently (e.g., each computing system 600 may execute one or more separate instances of the processes 400 and/or 500), in parallel (e.g., each computing system 600 may execute a portion of a single instance of a process 400 and/or 500), etc. For example, a distributed computing environment may provide hosted capabilities for implementing the systems and methods described herein.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a computer-readable memory storing executable instructions; and
    one or more processors in communication with the computer-readable memory and programmed by the executable instructions to at least:
        receive, from a first user device, a data file associated with a user profile;
        determine, based at least partly on a size of the data file, to store the data file as a plurality of encrypted portions;
        generate a first encrypted portion of the plurality of encrypted portions using a first portion of the data file, a file-level key, and a first portion-level initialization vector, wherein the first encrypted portion is associated with a first sequence identifier and first authentication data;
        generate a second encrypted portion of the plurality of encrypted portions using a second portion of the data file, the file-level key, and a second portion-level initialization vector, wherein the second portion-level initialization vector is different than the first portion-level initialization vector, and wherein the second encrypted portion is associated with a second sequence identifier and second authentication data;
        store the first encrypted portion and the second encrypted portion in a persistent storage system;
        receive, from a second user device, a request for the data file, wherein the request is associated with the user profile;
        obtain the first encrypted portion from the persistent storage system based at least partly on the first sequence identifier;
        determine, using the first authentication data, that the first encrypted portion is a valid encrypted version of the first portion;
        provide, to the second user device, the first sequence identifier and a first decrypted portion based at least partly on the first encrypted portion;
        obtain the second encrypted portion from the persistent storage system based at least partly on the second sequence identifier;
        determine, using the second authentication data, that the second encrypted portion is an invalid encrypted version of the second portion; and
        terminate a response to the request based at least partly on the second decrypted portion being an invalid encrypted version.

2. The system of claim 1, wherein the one or more processors are further programmed by the executable instructions to at least:
    determine a size of the first portion based at least partly on at least one of: a content type of the data file; a content type of the first portion; a processing capability of the system; or a processing capability of the first user device; and
    determine a size of the second portion based at least partly on at least one of: a content type of the data file; a content type of the second portion; a processing capability of the system; or a processing capability of the first user device.

3. The system of claim 1, wherein the one or more processors are further programmed by the executable instructions to at least:
    mark at least one of the data file or the second encrypted portion as invalid;
    transmit a message to the second user device regarding invalidity of at least one of the data file or the second encrypted portion; and
    initiate an authentication failure recovery process.

4. A computer-implemented method comprising:
    as performed by a computing system configured to execute specific instructions, receiving a data object to be securely stored, the data object comprising a first portion and a second portion;
    generating a first encrypted portion of the data object using the first portion, a file-level key, and a first portion-level initialization vector, wherein the first encrypted portion is associated with first authentication data;
    generate a second encrypted portion of the data object using the second portion, the file-level key, and a second portion-level initialization vector, wherein the second portion-level initialization vector is different than the first portion-level initialization vector, and wherein the second encrypted portion is associated with second authentication data;
    receiving, from a user device, a request for the data object;
    obtaining the first encrypted portion of the data object from a storage system based at least partly on first sequence data associated with the first encrypted portion;
    determining an authenticity of the first encrypted portion using the first authentication data;
    generating a first decrypted portion from the first encrypted portion;
    transmitting the first decrypted portion to the user device;
    obtaining the second encrypted portion of the data object from the storage system based at least partly on second sequence data associated with the second encrypted portion;
    determining an authenticity of the second encrypted portion using the second authentication data;
    generating a second decrypted portion from the second encrypted portion; and transmitting the second decrypted portion to the user device.

5. The computer-implemented method of claim 4, wherein determining the authenticity of the second decrypted portion occurs after transmission of the first decrypted portion to the user device.

6. The computer-implemented method of claim 4, further comprising transmitting sequence data regarding an ordinal position in which at least one of the first decrypted portion or the second decrypted portion is to be arranged.

7. The computer-implemented method of claim 4, further comprising:
determining, based at least partly on a size of the data object, to partition the data object into a plurality of portions.

8. The computer-implemented method of claim 4, further comprising:
determining, based at least partly on a content type of the data object, a first size of a first portion of the data object and a second size of a second portion of the data object.

9. The computer-implemented method of claim 4, further comprising:
generating the first authentication data using the first encrypted portion, wherein the first authentication data comprises a hashed message authentication code, and wherein determining the authenticity of the first encrypted portion comprises comparing the first authentication data to the first encrypted portion.

10. The computer-implemented method of claim 4, wherein the first authentication data is based at least partly on data regarding generating the first encrypted portion, and
wherein determining the authenticity of the first encrypted portion comprises comparing the first authentication data to data regarding generating the first decrypted portion.

11. The computer-implemented method of claim 4, further comprising:
determining that the data object comprises a base resource referencing a plurality of embedded resources; and
determining to partition the data object into at least the first portion, comprising the base resource, and the second portion, comprising at least one of the plurality of embedded resources.

12. The computer-implemented method of claim 4, further comprising:
obtaining a third encrypted portion of the data object from the storage system based at least partly on third sequence data associated with the third encrypted portion; and
determining that authenticity of the third encrypted portion cannot be verified using third authentication data associated with the third encrypted portion.

13. The computer-implemented method of claim 12, further comprising canceling transmission of a decrypted portion of the data object to the user device subsequent to determining that authenticity of the third encrypted portion cannot be verified.

14. The computer-implemented method of claim 12, further comprising initiating an authentication failure workflow in response to determining that authenticity of the third encrypted portion cannot be verified.

15. The computer-implemented method of claim 4, further comprising receiving the data object from the user device.

16. The computer-implemented method of claim 4, further comprising receiving the data object from a second user device, wherein the second user device is different than the user device.

17. A system comprising:
a first computing device configured to at least:
receive, from a user device, a first portion of a data file to be securely stored remote from the user device, wherein the first portion is associated with first sequence data; and
generate a first encrypted portion of the data file using the first portion, a file-level key, and a first portion-level initialization vector, wherein the first encrypted portion is associated with first authentication data;
a second computing device configured to at least:
receive, from the user device, a second portion of the data file, wherein the second portion is associated with second sequence data; and
generate a second encrypted portion of the data file using the second portion, the file-level key, and a second portion-level initialization vector, wherein the second portion-level initialization vector is different than the first portion-level initialization vector, and wherein the second encrypted portion is associated with second authentication data; and
a third computing device configured to at least:
receive, from the user device, a request for the data file;
authenticate the first encrypted portion;
transmit, to the user device, the first portion and the first sequence data;
authenticate the second encrypted portion; and
transmit, to the user device, the second portion and the second sequence data, wherein the user device is configured to generate the data file using the first portion and the second portion.

18. The system of claim 17, wherein receipt of the second portion by the second device occurs concurrently with receipt of at least a portion of the first portion by the first device.

19. The system of claim 17, wherein the first computing device is further configured to restart reception of the first portion of the data file after a transmission error.

20. The system of claim 17, wherein the third computing device is further configured to generate the first portion using the first encrypted portion.

* * * * *